UNITED STATES PATENT OFFICE.

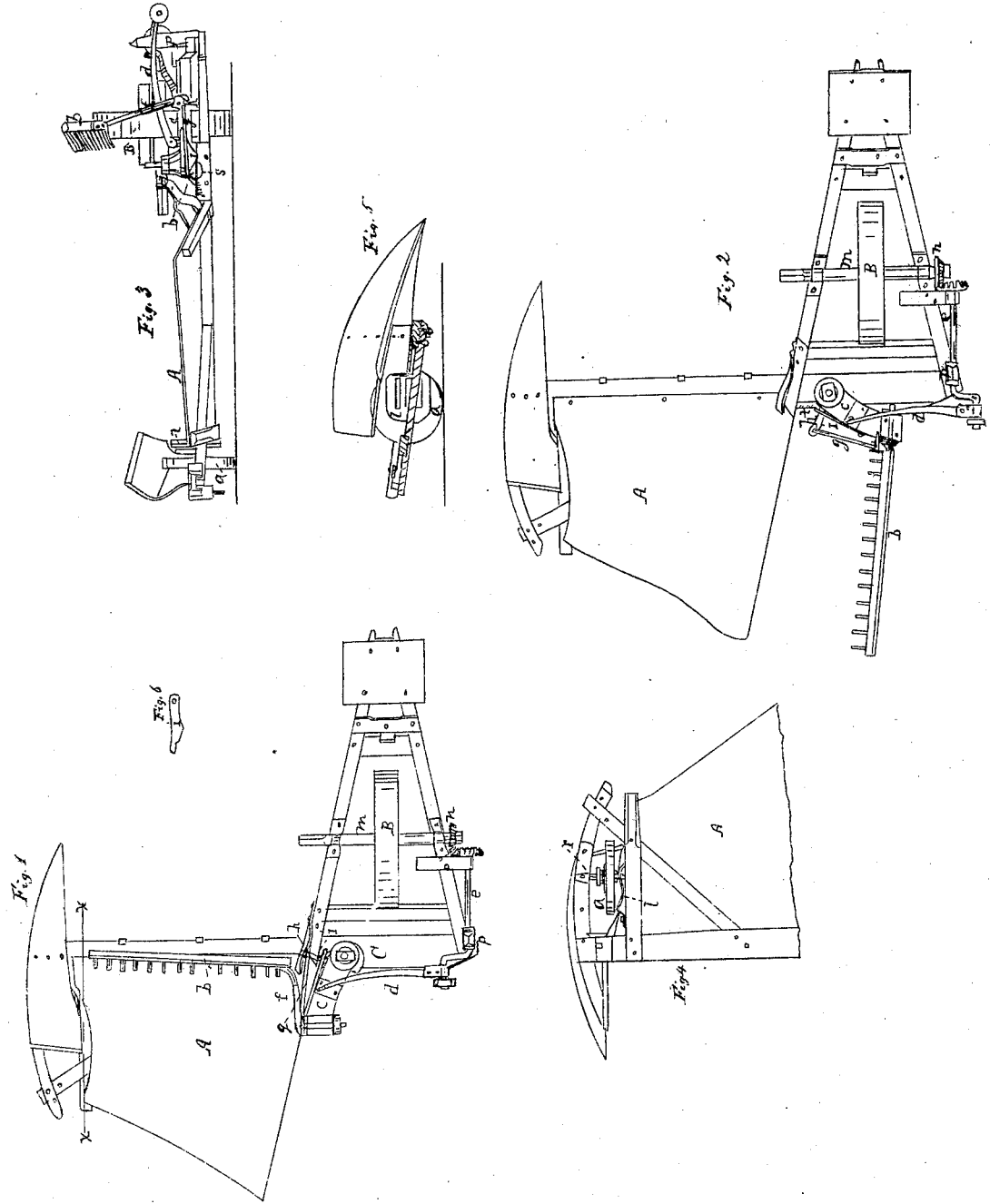

WILLIAM WEBBER, JR., AND JOHN WEBBER, OF ROCKTON, ILLINOIS.

IMPROVEMENT IN HARVESTING-MACHINES.

Specification forming part of Letters Patent No. 23,417, dated March 29, 1859.

*To all whom it may concern:*

Be it known that we, WM. WEBBER, Jr., and JOHN WEBBER, of Rockton, in the county of Winnebago and State of Illinois, have invented certain new and useful Improvements in Harvesting-Machines; and we do hereby declare that the following is a full and exact description thereof, reference being had to the accompanying drawings, in which—

Figures 1 and 2 are top views of our improved harvesting-machine, showing the automatic raking apparatus in different positions. Fig. 3 is a rear view of said machine, with the raking apparatus in the position shown in Fig. 2. Fig. 4 is a view of the under side of the outer end of the platform. Fig. 5 is a section in the line $x\,x$ of Fig. 1, and Fig. 6 a view of a detached portion of the machine.

Wherever the same part occurs it is marked by the same letter of reference.

Our invention consists in the costruction and arrangement of devices, hereinafter particularly described, for working the rake of a harvester automatically.

The frame of the machine is constructed in any of the well-known modes, the platform and rake being so arranged as to deliver the grain at the side, and in the rear of the path of the horses.

On the end of the shaft $m$ of the driving-wheel B is fixed a bevel-pinion, $n$, gearing into a similar pinion on the end of shaft $e$. This shaft passes backward through the standard $p$, and has a crank or winch on its end, as shown in Figs. 1 and 2. This crank operates pitman $d$, which is attached by a universal joint to arm $c$. Arm $c$ is pivoted to the portion C of the frame of the machine, and is vibrated horizontally by means of pitman $d$.

To the free end of arm $c$ the handle $f$ of the rake $b$ is hinged, so as to be capable of a vertical vibratory motion. The handle $f$ has a short arm, $k$, projecting downward at an angle from its extremity, and to this arm is loosely attached the rod $g$, which serves to connect the same with the outer end of the arm $h$, which is attached to and moves on the same axis as arm $c$. The movement of arm $h$ in a backward direction is limited by a stop attached to the frame.

Pivoted to arm $c$ is a latch, $i$. (Shown separately in Fig. 6.) This latch works vertically and catches the arm $h$ in certain positions of the rake, as hereinafter explained. When the rake is in the position shown in Fig. 1 the latch is not in operation; but when the rake assumes the position shown in Fig. 2 the latch $i$ catches the arm $h$ and holds it in a fixed position relatively to arm $c$ until the rake has returned to the front of the platform, when the latch is raised by reason of its inclined under side coming into contact with the edge of the frame at $t$, which forces it up as the arm $c$ moves forward, and thereby releases the arm $h$ and suffers the rake to fall upon the platform, ready for another sweep across the same.

The operation of the portion of the machine thus far described is as follows: Starting at the position shown in Fig. 1, as the arm $c$ moves backward it carries the rake $b$ in a radial sweep across the platform. When the rake has reached the end of its backward stroke the arm $h$ is prevented by the stop $s$ from moving farther back. The arm $c$, however, continues to move outward till it reaches the position shown in Fig. 2. The arm $h$ being fixed and the arm $c$ moving, the rod $g$, by reason of its attachment to arm $k$, raises the rake-handle $f$ to the position shown in Fig. 3. At the same time, as the arm $c$ moves outward after the arm $h$ has stopped, the latch $i$ descends along arm $h$ till the notch in the latch catches the arm and holds it at a fixed distance from the hinge of the rake-handle. The rake is thus held up while the arm $c$ is returning to the initial position shown in Fig. 1. Just before reaching this position the inclined under side of latch $i$ comes in contact with the frame at $t$, which forces up the latch, as before described, releases the arm $h$, and suffers the rake to fall onto the platform at its front edge, ready for a repetition of the operation.

The mode of hanging and adjusting the wheel on the outer end of the platform, which constitutes the second part of our invention, is shown in Figs. 4 and 5, in which $a$ marks the wheel, $r$ its axle, and $l$ the curved and slotted plate in which the inner end of the axle plays. The wheel is placed loosely on its axle, on which it rotates freely, like a loose pulley on a shaft. The outer end of the axle has an eye in it, by which it is loosely pivoted in one of two slots made to receive it by means of a vertical pin or bolt passing through its eye. This arrangement allows the axle free horizontal vibratory movement. The inner end of the axle is received by one of the slots in the curved plate $l$, in either of which it may be placed, according to the height above the ground at which it is desired to hold the platform. It is free to slide along the full length of these slots, so as to adapt the position of the wheel $a$ to any variation in the direction of the machine, thus avoiding the strain in turning incident to a rigidly-fixed wheel.

What we claim as our invention, and desire to secure by Letters Patent, is—

Operating the rake of a harvester by means of the horizontally-oscillating arms $c$ and $h$, the rod $g$, and the latch $i$, when the said parts are arranged relatively to each other, and to the other parts of the machine, in the manner herein set forth.

The above specification of our improvements in harvesting-machines signed and witnessed this 11th day of December, 1858.

WILLIAM WEBBER, JR.
JOHN WEBBER.

Witnesses:
W. R. WELD,
F. B. MASON.